(12) United States Patent
Nochi et al.

(10) Patent No.: US 9,192,920 B2
(45) Date of Patent: Nov. 24, 2015

(54) EXHAUST GAS TREATMENT CATALYST AND METHOD FOR REGENERATING THE SAME

(71) Applicant: MITSUBISHI HITACHI POWER SYSTEMS, LTD., Yokohama, Kanagawa (JP)

(72) Inventors: Katsumi Nochi, Tokyo (JP); Masanao Yonemura, Tokyo (JP); Masanori Demoto, Tokyo (JP); Masashi Kiyosawa, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 0 days.

(21) Appl. No.: 14/017,741

(22) Filed: Sep. 4, 2013

(65) Prior Publication Data
US 2014/0080695 A1    Mar. 20, 2014

(30) Foreign Application Priority Data

Sep. 5, 2012   (JP) .................................. 2012-195138
Sep. 3, 2013   (JP) .................................. 2013-182381

(51) Int. Cl.
| | |
|---|---|
| *B01J 38/64* | (2006.01) |
| *B01J 23/92* | (2006.01) |
| *B01J 23/22* | (2006.01) |
| *B01J 38/48* | (2006.01) |
| *B01J 38/60* | (2006.01) |
| *B01J 23/30* | (2006.01) |
| *B01D 53/86* | (2006.01) |
| *B01J 38/12* | (2006.01) |
| *B01J 21/08* | (2006.01) |
| *B01J 35/00* | (2006.01) |

(52) U.S. Cl.
CPC .............. *B01J 23/92* (2013.01); *B01D 53/8628* (2013.01); *B01D 53/8696* (2013.01); *B01J 23/22* (2013.01); *B01J 23/30* (2013.01); *B01J 38/48* (2013.01); *B01J 38/60* (2013.01); *B01J 38/64* (2013.01); *B01D 2251/2062* (2013.01); *B01D 2255/20707* (2013.01); *B01D 2255/20723* (2013.01); *B01D 2255/20776* (2013.01); *B01D 2255/30* (2013.01); *B01J 21/08* (2013.01); *B01J 35/002* (2013.01); *B01J 38/12* (2013.01); *B01J 2523/00* (2013.01)

(58) Field of Classification Search
CPC .............. B01J 38/64; B01J 21/00; B01J 38/60
USPC .............................. 502/25, 247, 248, 27, 514
See application file for complete search history.

(56) References Cited

U.S. PATENT DOCUMENTS

| | | | |
|---|---|---|---|
| 6,491,886 B1 * | 12/2002 | Hedouin et al. ............ | 423/239.1 |
| 7,727,931 B2 * | 6/2010 | Brey et al. ...................... | 502/344 |

FOREIGN PATENT DOCUMENTS

| | | |
|---|---|---|
| JP | 3059136 B2 | 7/2000 |
| JP | 3059137 B2 | 7/2000 |
| JP | 4436124 B2 | 3/2010 |

* cited by examiner

*Primary Examiner* — Edward Johnson
(74) *Attorney, Agent, or Firm* — Westerman, Hattori, Daniels & Adrian, LLP

(57) ABSTRACT

Provided are an exhaust gas treatment catalyst for denitrifying an exhaust gas including sulfur oxides and vanadium discharged from a heavy oil combustion boiler, including: a support comprising any one or all of titanium oxide and silica wherein a content of silica is from 10% to 20%, and an active component supported in the support and comprising one selected from the group consisting of vanadium and tungsten.

3 Claims, 4 Drawing Sheets

EXHAUST GAS TREATMENT CATALYST AND METHOD FOR REGENERATING THE SAME

CROSS-REFERENCE TO RELATED APPLICATIONS

This application is based upon and claims the benefit of priority from Japanese Patent Application No. 2012-195138 filed Sep. 5, 2012 and Japanese Patent Application No. 2013-182381 filed Sep. 3, 2013, the entire contents of which are incorporated herein by reference.

BACKGROUND OF THE INVENTION

1. Field of the Invention

The present invention relates to an exhaust gas treatment catalyst that remove nitrogen oxides from an exhaust gas discharged from combustion devices such as heavy oil combustion boilers and the like using low-grade fuel and the like and a method for regenerating the exhaust gas treatment catalyst.

2. Description of the Related Art

Recently, focus has been placed on the effective utilization of coal, and in the future, it is predicted that demand on the clean process of using coal will be increased. In order to convert coal into a highly value-added energy medium, advanced technologies, such as a coal gasification technology or a gas purification technology, are used.

As a removal method of nitrogen oxides ($NO_x$) generated from boilers or various combustion furnaces, an ammonia contact reduction method that uses ammonia as a reducing agent and allows a catalyst to decompose nitrogen oxides into nitrogen and water per contiguum has been widely used. As a $NO_x$ removal catalyst that has been currently put to practical use, a honeycomb-shaped catalyst having a square aperture shape has become a mainstream in order to prevent blockage by dust in the exhaust gas and increase the contact area of the exhaust gas. Further, as a catalyst component, catalyst components using titanium oxide as a main component are excellent and catalyst components including vanadium, tungsten and the like as an active component are generally used.

In the case of a coal combustion boiler exhaust gas, calcium components contained usually in the dust in the exhaust gas are adhered to the catalyst surface, anhydrous calcium sulfate included in the exhaust gas is produced to cover the catalyst surface, and NO and $NH_3$ gases are prevented from being diffused into the catalyst, thereby degrading the performance of the catalyst. In order to regenerate the catalytic performance of the $NO_x$ removal catalysts, there has been proposed a method for recovering the catalytic performance of the $NO_x$ removal catalyst, including: cleaning catalyst accumulated materials with an alkali aqueous solution and removing the materials and then performing an activating treatment of the catalyst with an acid aqueous solution (see, for example, Japanese Patent No. 3059136 and Japanese Patent No. 3059137).

Here, several % vanadium (V) is included in the dust in the exhaust gas discharged from heavy oil combustion boilers and the like using low-grade fuel and the like, and vanadium in the exhaust gas is deposited as a V compound such as vanadium oxysulfate ($VOSO_4$) and the like on the surface of the $NO_x$ removal catalyst during the operation. Vanadium is a material that is an active component of a $NO_x$ removal catalyst and also promotes the oxidation reaction of $SO_2$ as a side reaction, and thus as times passes, the oxidation reaction rate of $SO_2$ in the $NO_x$ removal catalyst is increased, thereby increasing the amount of corrosive $SO_3$ discharged into the slipstream side. In addition, when a film of $VOSO_4$ is precipitated on the surface of the $NO_x$ removal catalyst, the catalytic performance of the $NO_x$ removal catalyst also deteriorates in order to suppress the gas diffusion of the exhaust gas.

However, as a method for recovering the catalyst performance of a nitrification catalyst in the related art, an arsenic compound ($As_2O_3$) accumulated on the catalyst surface, which is caused by arsenic (As) included in the exhaust gas discharged from coal combustion boilers, may be efficiently removed, but $VOSO_4$ may not be sufficiently removed. For this reason, when $VOSO_4$ accumulated on the catalyst surface of the $NO_x$ removal catalyst is removed to recover the catalytic performance of the $NO_x$ removal catalyst and regenerate the $NO_x$ removal catalyst, the $NO_x$ removal catalyst deteriorates and the strength of the $NO_x$ removal catalyst is easily reduced, thereby making it difficult to reuse the $NO_x$ removal catalyst.

Thus, in the regeneration of the $NO_x$ removal catalyst whose $NO_x$ removal performance is reduced by the accumulation of V compounds such as $VOSO_4$ and the like generated by vanadium present in the exhaust gas, there is need for an exhaust gas treatment catalyst which may be regenerated while suppressing the reduction in strength of the $NO_x$ removal catalyst and a method for regenerating the exhaust gas treatment catalyst.

SUMMARY OF THE INVENTION

According to an aspect of the present invention, there is provided an exhaust gas treatment catalyst for denitrifying an exhaust gas including sulfur oxides and vanadium discharged from a heavy oil combustion boiler, including: a support comprising titanium and silica wherein a content of silica is 10% by mass or more, and an active component supported in the support and comprising one selected from the group consisting of vanadium and tungsten.

According to another aspect of the present invention, there is provided an method for regenerating an exhaust gas treatment catalyst whose $NO_x$ removal performance is reduced by sulfur dioxides and vanadium included in an exhaust gas discharged from a heavy oil combustion boiler, the exhaust gas treatment catalyst including: titanium and silica; and an active component comprising one selected from the group consisting of vanadium and tungsten in a support having an Si content of 10% by mass or more, and the method including: immersing the exhaust gas treatment catalyst in an alkali cleaning liquid at a concentration from 0.5 N to 2.0 N so as to remove vanadium oxysulfate on the surface of the exhaust gas treatment catalyst, and subjecting the catalyst to activation treatment with an acid aqueous solution after cleaning the exhaust gas treatment catalyst with the alkali cleaning liquid.

DETAILED DESCRIPTION OF THE PREFERRED EMBODIMENTS

Hereinafter, the present invention will be described in detail with reference to the drawings. Note that, the present invention is not limited to the following embodiments of the present invention. In addition, constituting elements in the following embodiments include elements which may be easily assumed by those skilled in the art, which are substantially the same, and which are so-called in an equivalent range. Moreover, constituent elements disclosed in the following embodiments may be appropriately combined.

The embodiments of the present invention has an object to provide an exhaust gas treatment catalyst which may be regenerated while suppressing the reduction in strength of the catalyst and a method for regenerating the exhaust gas treatment catalyst.

<Exhaust Gas Treatment Catalyst>

Figure 1:
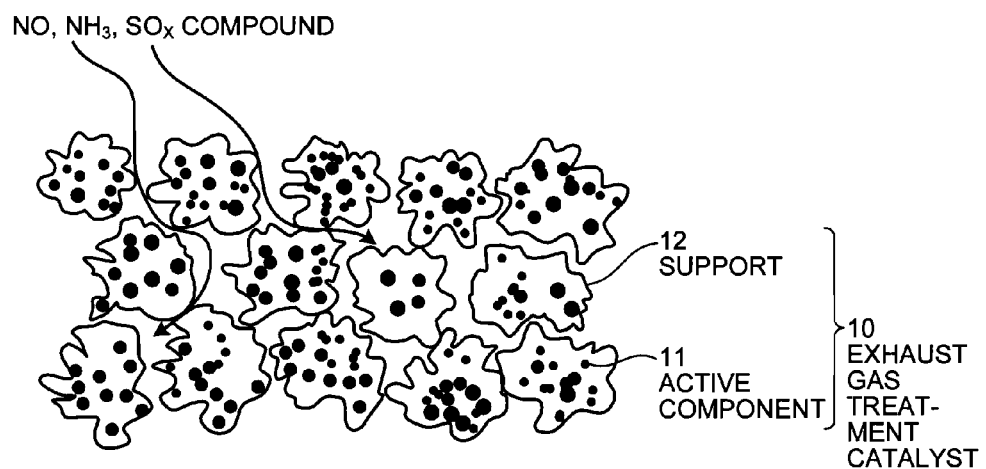
FIG. 1 is a schematic view illustrating an exhaust gas treatment catalyst according to the embodiment of the present invention.

An exhaust gas treatment catalyst according to the embodiment of the present invention will be described with reference to the drawings. FIG. 1 is a schematic view illustrating an exhaust gas treatment catalyst according to the embodiment. As illustrated in FIG. 1, an exhaust gas treatment catalyst 10 according to the embodiment is an exhaust gas treatment catalyst that denitrifies an exhaust gas including sulfur oxides ($SO_x$) and vanadium (V) discharged from heavy oil combustion boilers, and a catalyst that has an active component 11 and a support 12 and has the active component 11 in a support 12. In the exhaust gas treatment catalyst 10 according to the embodiment, when NO, $NH_3$, $SO_x$ and V (for example, V compound) in the exhaust gas are diffused into the exhaust gas by adding ammonia ($NH_3$) to the exhaust gas, NO is reduced to $NO_2$, thereby achieving $NO_x$ removal.

Examples of the active component 11 include one component selected from the group consisting of vanadium (V) and tungsten (W). The active component 11 may include at least one of molybdenum (Mo), iron (Fe), cobalt (Co), platinum (Pt), nickel (Ni), ruthenium (Ru), iridium (Ir), rhodium (Rh) and the like in addition to V and W. Examples of the active component 11 may include simple substances thereof, mixtures thereof and the like.

The support 12 is composed of titanium (Ti) and silicon (Si). The support 12 may be composed of aluminum (Al), zirconium (Zr), cerium (Ce) and the like in addition to titanium (Ti) and silicon (Si). The support 12 is preferably an oxide of $TiO_2$, $SiO_2$, $Al_2O_3$, $ZrO_2$ and $CeO_2$. Furthermore, the support 12 may include a complex oxide in which at least two thereof or two or more elements are present. Examples of the complex oxide include $TiO_2$—$SiO_2$—$Al_2O_3$, $TiO_2$—$SiO_2$—$ZrO_2$, $TiO_2$—$SiO_2$—$CeO_2$ and the like. Further, the support 12 may also be used in combination of the complex oxide and the mixture.

The content of Si in the support 12 is from 10% by mass to 20% by mass and more preferably from 10% by mass to 15% by mass. More preferably, the content is from 11% by mass to 13% by mass.

The content of 10% by mass or less is not preferable because, as illustrated in the following test example, Si dissolves under alkaline conditions and the rate of remaining in the support 12 decreases and accordingly the compressive strength decreases. Meanwhile, the content of 20% by mass or more is not preferable because, when a honeycomb catalyst is molded, the shape retention after unmolding is not preferable.

When the exhaust gas treatment catalyst 10 according to the embodiment is regenerated by including Si in the support 12 in the above range, the exhaust gas treatment catalyst 10 according to the embodiment may be regenerated without reducing the strength thereof even when dipped in an alkali solution. Note that, the strength of the exhaust gas treatment catalyst 10 according to the embodiments is obtained by measuring the compressive strength and the like using a hardness tester such as, for example, Kiya type hardness tester and the like.

Figure 4:
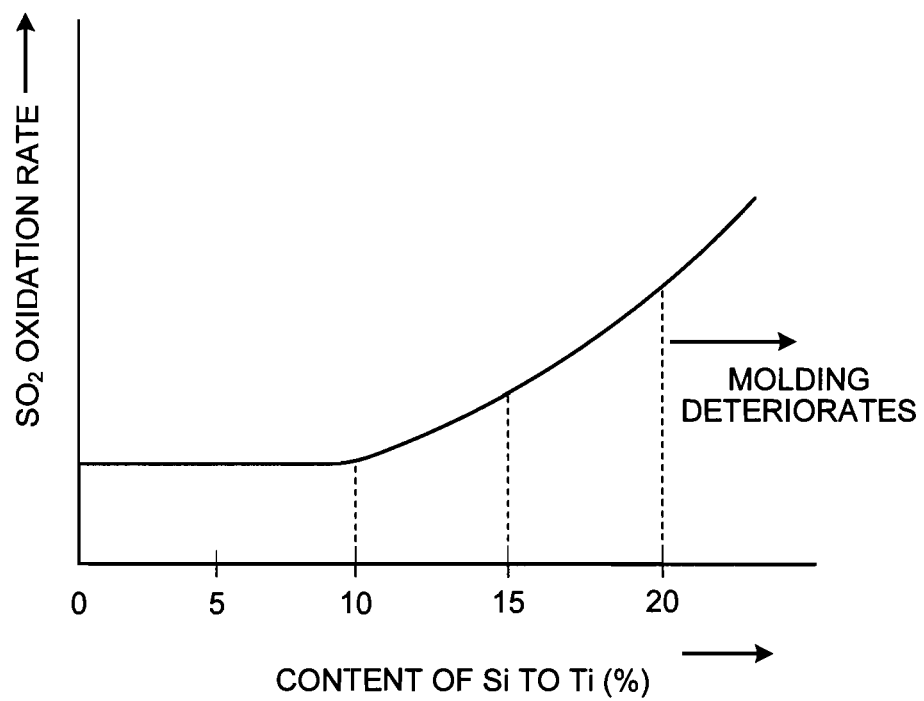
FIG. 4 is a view illustrating the relationship between the Si content (% by mass) to Ti and the $SO_2$ oxidation rate of a regenerated catalyst.

FIG. 4 is a view illustrating the relationship between the Si content (% by mass) to Ti and the $SO_2$ oxidation rate of a regenerated catalyst. As illustrated in FIG. 4, when Si exceeds 10% by mass and if the catalyst is regenerated so that active components of $V_2O_5$ and $WO_3$ are resupported, the $SO_2$ oxidation rate improves. Note that 20% by mass or more deteriorates molding.

Accordingly, the exhaust gas treatment catalyst according to the embodiment may contain a predetermined amount of Si in a support to suppress the deterioration caused by a sodium hydroxide aqueous solution used during the regeneration thereof, and thus the exhaust gas treatment catalyst may be regenerated while suppressing the deterioration of the strength thereof. For this reason, when the exhaust gas treatment catalyst according to the embodiment is used, the catalyst may be reused in a good state while maintaining the removal performance of $NO_x$ included in the exhaust gas discharged from combustion devices such as heavy oil combustion boilers and the like using a low-grade fuel and the like.

Figure 2:
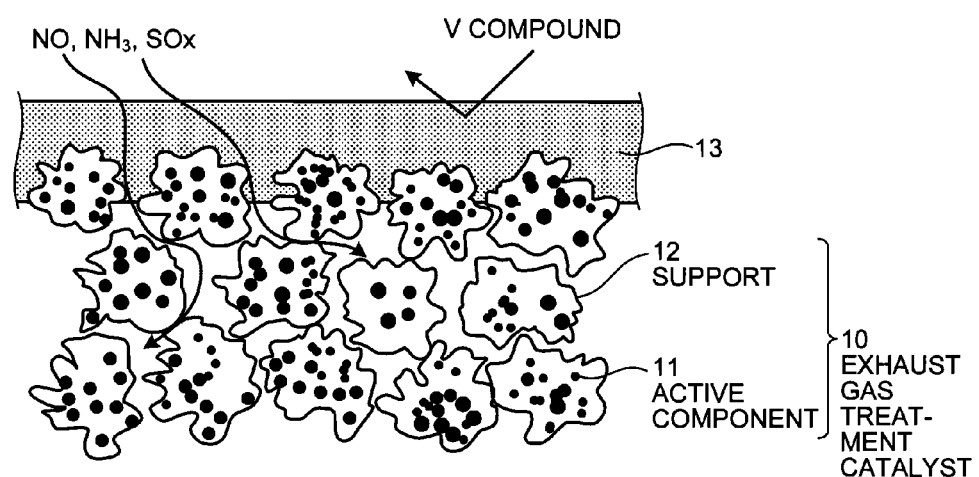
FIG. 2 is a view illustrating another configuration of the exhaust gas treatment catalyst.

In addition, the exhaust gas treatment catalyst 10 according to the embodiment may also have a coating layer 13 formed of at least one component selected from the group consisting of silicalite and metallosilicate on the surface thereof, as illustrated in FIG. 2. It is possible to diffuse NO, $NH_3$ and $SO_x$ in the exhaust gas into the catalyst, reduce NO into $NO_2$ to achieve $NO_x$ removal, and suppress V (for example, V compound) from infiltrating into the catalyst by forming the coating layer 13 on the surface of the exhaust gas treatment catalyst 10.

Here, in the $NO_x$ removal of NO included in the exhaust gas by using the exhaust gas treatment catalyst 10 according to the embodiment, when the exhaust gas is a flue gas produced by combusting heavy oil in a boiler, V components are included in large amounts in the heavy oil. For this reason, when the V component in a state of vanadium pentoxide ($V_2O_5$) flies from the boiler to the exhaust gas treatment catalyst 10 according to the embodiment and is adhered to the catalyst, the V component is reacted with sulfur dioxide ($SO_2$) and sulfur trioxide ($SO_3$) included in the exhaust gas as in the following Reaction Formula (I), and thus accumulated on the exhaust gas treatment catalyst 10 according to the embodiment in a state of vanadium oxysulfate ($VOSO_4$). The accumulation amount also differs depending on the content of sulfur (S) components in the heavy oil, but when the component is included in an amount of 1% by mass or more, the vanadium oxysulfate ($VOSO_4$) is significantly accumulated. For this reason, when NO included in the exhaust gas produced by using heavy oil as a boiler fuel is denitrified by the exhaust gas treatment catalyst 10 according to the embodiment, $VOSO_4$ accumulated on the surface of the exhaust gas treatment catalyst 10 according to the embodiment is removed to regenerate the catalyst.

$$V_2O_5 + SO_2 + SO_3 \rightarrow 2VOSO_4 \quad (1)$$

<Method for Regenerating Exhaust Gas Treatment Catalyst>

Figure 3:
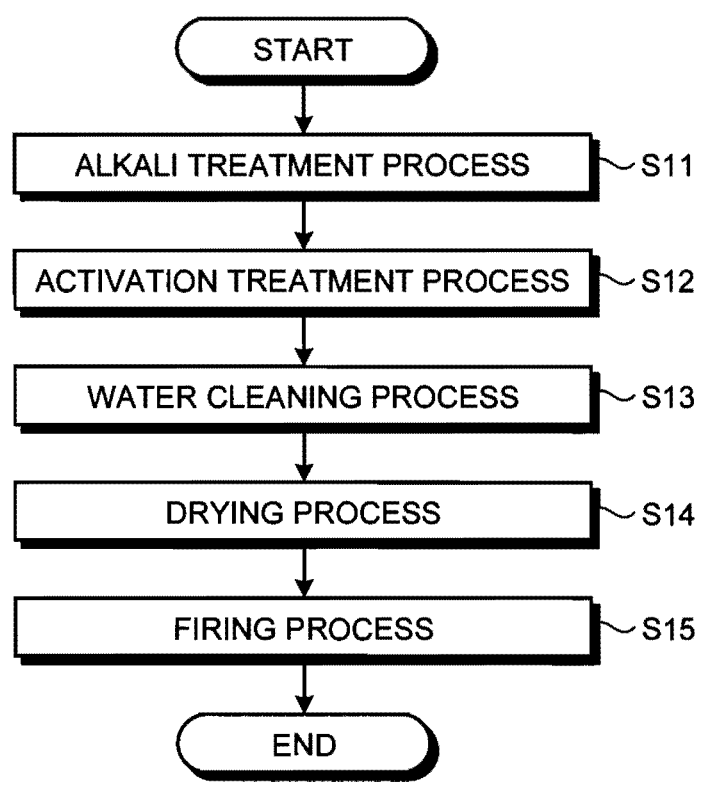
FIG. 3 is a flowchart illustrating an example of a method for regenerating the exhaust gas catalyst according to the embodiment of the present invention.

An example of a method for regenerating the exhaust gas treatment catalyst according to the embodiment of the present invention having the constitution as described above will be described by using the drawings. FIG. 3 is a flowchart illustrating an example of a method for regenerating the exhaust gas catalyst according to the embodiment. As illustrated in FIG. 3, the method for regenerating the exhaust gas treatment catalyst according to the embodiment has the following processes.

(a) an alkali treatment process of immersing an exhaust gas treatment catalyst in an alkali cleaning liquid at a concentration from 0.7 N to 2.0 N to remove $VOSO_4$ on the surface of the exhaust gas treatment catalyst (step S11)

(b) an activation treatment process of subjecting the catalyst to activation treatment with an acid aqueous solution after cleaning the exhaust gas treatment catalyst with an alkali cleaning liquid (step S12)

(c) a water cleaning process of cleaning the exhaust gas treatment catalyst with water after subjecting the exhaust gas treatment catalyst to activation treatment (step S13)

(d) a drying process of drying the exhaust gas treatment catalyst after cleaning the exhaust gas treatment catalyst with water (step S14), and (e) a firing process of firing the exhaust gas treatment catalyst after drying the exhaust gas treatment catalyst (step S15).

(Alkali Treatment Process: Step S11)

The operation of a boiler is stopped to take out the exhaust gas treatment catalyst according to the embodiment from a $NO_x$ removal equipment, preliminarily cleaning the taken-out exhaust gas treatment catalyst according to the embodiment with water, and then immersing the exhaust gas treatment catalyst according to the embodiment in an alkali cleaning liquid to remove $VOSO_4$ accumulated on the surface of the exhaust gas treatment catalyst (alkali treatment process: step S11).

When the exhaust gas treatment catalyst according to the embodiment is preliminarily cleaned with water, water at normal temperature is used, and the exhaust gas treatment catalyst according to the embodiment is immersed therein for a predetermined time (for example, approximately 30 minutes). The temperature of water is preferably from 10° C. to 80° C. This is because there is concern that heat energy which is not necessary to cool water may be produced when the temperature is lower than 10° C., and unnecessary heat energy may be produced even when the temperature is higher than 80° C. The time for immersion in water is preferably from 30 minutes to 5 hours. This is because there is concern that smoke dust and the like adhered to the exhaust gas treatment catalyst may not be sufficiently removed when the time is shorter than 30 minutes, and even when the time is longer than 5 hours, smoke dust and the like adhered on the catalyst are sufficiently removed until the period, and thus further cleaning effects are little obtained.

As the alkali cleaning liquid, an alkali aqueous solution is used. As the alkali aqueous solution, an aqueous solution of, for example, sodium hydroxide (NaOH), potassium hydroxide (KOH), sodium carbonate ($Na_2CO_3$), sodium bicarbonate ($NaHCO_3$) or potassium carbonate ($K_2CO_3$) and the like may be used, and among them, NaOH is preferred from the viewpoint of readiness in use and costs.

It is preferred that the concentration of the alkali cleaning liquid is usually in a range from 0.05% by weight to 20% by weight. This is because the cleaning effects may not be sufficiently achieved in some cases when the concentration of the alkali cleaning liquid is less than 0.05% by weight, and the costs of treatment facilities may be increased in some cases when the concentration of the alkali cleaning liquid is more than 20% by weight. Furthermore, when a NaOH aqueous solution is used as the alkali cleaning liquid, the concentration of the NaOH aqueous solution is preferably from 0.5 N to 2.0 N, more preferably from 0.7 N to 1.5 N and even more preferably from 0.8 N to 1.2 N. This is because cleaning effects of the catalyst may not be sufficient in some cases when the concentration of the NaOH aqueous solution is less than 0.5 N, and the costs of treatment facilities may be increased in some cases when the concentration of the NaOH aqueous solution is more than 2.0 N.

The temperature of the alkali cleaning liquid is preferably from 10° C. to 90° C., more preferably from 20° C. to 75° C. and even more preferably from 40° C. to 65° C. This is because the cleaning effects of the catalyst may not be sufficient in some cases when the temperature of the alkali cleaning liquid is lower than 10° C., and the costs of treatment facilities may be increased in some cases when the temperature of the alkali cleaning liquid is higher than 90° C.

In the embodiment, as the cleaning method of the catalyst, the exhaust gas treatment catalyst according to the embodiment is immersed in the alkali cleaning liquid to remove $VOSO_4$ on the surface of the exhaust gas treatment catalyst, but the cleaning method is not particularly limited, and a method for leaving a $NO_x$ removal catalyst to stand in an ammonia cleaning liquid may be used and the catalyst may also be cleaned by spraying the alkali cleaning liquid to the catalyst to contact the alkali cleaning liquid with the catalyst.

Further, an air supply unit for supplying air to the alkali cleaning liquid may be provided to supply air to the alkali cleaning liquid for bubbling, and forced convection may be generated to promote the cleaning efficiency of the catalyst.

(Activation Treatment Process: Step S12)

The exhaust gas treatment catalyst is cleaned with an alkali cleaning liquid, and then the exhaust gas treatment catalyst is immersed in an acid aqueous solution to subject the catalyst to activation treatment (activation treatment process: step S12).

In the alkali treatment process S11, $VOSO_4$ may be cleaned and removed from the surface of the exhaust gas treatment catalyst according to the embodiment, but when the alkali cleaning liquid used in cleaning and removal is remaining in the catalyst, ions of alkali components (alkali metal ions, alkali earth metal ions and the like) may remain in the exhaust gas treatment catalyst according to the embodiment, and the exhaust gas treatment catalyst according to the embodiment is poisoned by the ions of alkali components. The ions of alkali components may be responsible for the deterioration of the exhaust gas treatment catalyst according to the embodiment, thereby reducing the strength of the exhaust gas treatment catalyst according to the embodiment.

Therefore, the exhaust gas treatment catalyst according to the embodiment is cleaned with the alkali cleaning liquid, and then the exhaust gas treatment catalyst according to the embodiment is immersed in an acid aqueous solution. Accordingly, ions of alkali components (alkali metal ions, alkali earth metal ions and the like) which may remain on the catalyst to become a poisoned material of the catalyst are ions converted into hydrogen ions (H+) of an acid aqueous solution of HCl and the like. As a result, ions of alkali components in the catalyst may be removed to recover the activity of the exhaust gas treatment catalyst according to the embodiment.

Further, as the acid aqueous solution, an acid aqueous solution including any one of an organic acid and an inorganic acid may be used, but considering the burden of post-treatment and the like, it is preferred that an acid aqueous solution using an inorganic acid is used. In addition, the inorganic acid may be used regardless of whether the acid is strong or weak as long as the acid is an inorganic acid capable of exchanging ions with sodium or potassium.

As the acid aqueous solution, it is possible to use an aqueous solution of, for example, hydrochloric acid (HCl), nitric acid ($HNO_3$), hydrogen fluoride (HF) or sulfuric acid ($H_2SO_4$) and the like.

The concentration of the acid aqueous solution differs depending on the acid aqueous solution used, but when the acid aqueous solution is a $H_2SO_4$ solution, the concentration of the $H_2SO_4$ solution is preferably from 0.5 N to 2.0 N, more preferably from 0.7 N to 1.5 N and even more preferably from 0.8 N to 1.2 N. This is because ions may not be sufficiently exchanged in some cases when the concentration of the $H_2SO_4$ solution is less than 0.5 N, and the costs of treatment facilities may be increased in some cases when the concentration of the $H_2SO_4$ solution is more than 2.0 N.

The temperature of the acid aqueous solution is preferably from 10° C. to 90° C., more preferably from 20° C. to 75° C. and even more preferably from 25° C. to 50° C. This is because ions may not be sufficiently exchanged in some cases when the temperature of the acid aqueous solution is lower than 10° C., and the costs of treatment facilities may be increased in some cases when the temperature of the acid aqueous solution is higher than 40° C.

(Water Cleaning Process: Step S13)

The exhaust gas treatment catalyst is cleaned with water after subjecting the exhaust gas treatment catalyst to activation treatment (water cleaning process: step S13). The exhaust gas treatment catalyst according to the embodiment is immersed for a predetermined time (for example, approximately 30 minutes). Accordingly, acid remaining in the exhaust gas treatment catalyst may be removed from the exhaust gas treatment catalyst. When the exhaust gas treatment catalyst according to the embodiment is cleaned with water, the temperature of water is preferably from 10° C. to 80° C. This is because there is concern that acid remaining in the exhaust gas treatment catalyst may not be sufficiently dissolved in water and removed when the temperature is lower than 10° C., and unnecessary heat energy is produced even when the temperature is higher than 80° C. The time for being immersed in water is preferably from 30 minutes to 5 hours. This is because there is concern that acid remaining in the exhaust gas treatment catalyst may not be sufficiently cleaned with water when the time is shorter than 30 minutes, and even when the time is longer than 5 hours, acid remaining in the fuel gas treatment catalyst is sufficiently removed by the meantime, and thus further cleaning effects are little obtained.

(Drying Process: Step S14)

The exhaust gas treatment catalyst is cleaned with water, and then the exhaust gas treatment catalyst is dried (drying process: step S14). The drying temperature of the exhaust gas treatment catalyst according to the embodiment is preferably, for example, from 90° C. to 150° C. This is because the catalyst may not be sufficiently dried in some cases when the drying temperature is lower than 90° C., and the costs of treatment facilities may be increased in some cases when the drying temperature is higher than 150° C. The drying time is preferably, for example, from 1 hour to 10 hours. This is because the catalyst may not be sufficiently dried in some cases when the drying time is less than 1 hour, and the costs of treatment facilities may be increased in some cases when the drying time is more than 10 hours.

(Firing Process: Step S15)

The exhaust gas treatment catalyst is dried, and then the exhaust gas treatment catalyst is fired (firing process: step S15). The firing temperature of the exhaust gas treatment catalyst according to the embodiment is preferably, for example, from 400° C. to 800° C., more preferably from 450° C. to 700° C. and even more preferably from 500° C. to 600° C. This is because the catalyst may not be sufficiently fired in some cases when the firing temperature is lower than 400° C., and the costs of treatment facilities may be increased in some cases when the firing temperature is higher than 800° C.

The time for firing the exhaust gas treatment catalyst according to the embodiment is preferably, for example, from 1 hour to 10 hours, more preferably from 2 hours to 7 hours and even more preferably from 3 hours to 5 hours. This is because the catalyst may not be sufficiently fired in some cases when the firing time is less than 1 hour, and the costs of treatment facilities may be increased in some cases when the firing time is more than 10 hours.

After the firing, the regenerated exhaust gas treatment catalyst according to the embodiment may be inserted into a $NO_x$ removal equipment to be reused.

When the method for regenerating the exhaust gas treatment catalyst according to the embodiment of the present invention is used in this manner, it is possible to remove $VOSO_4$ accumulated on the catalyst surface and suppress the deterioration of the catalyst caused by an alkali solution used when $VOSO_4$ accumulated on the catalyst surface is removed to regenerate the catalyst. Further, it is possible to remove all of the ions of alkali components in the exhaust gas treatment catalyst according to the embodiment by subjecting the exhaust gas treatment catalyst according to the embodiment to activation treatment. Therefore, even though $VOSO_4$ accumulated on the catalyst surface is dissolved when the exhaust gas treatment catalyst according to the embodiment is used to remove $NO_x$ in the combustion exhaust gas, the exhaust gas treatment catalyst according to the embodiment may be regenerated while suppressing the reduction in strength of the catalyst.

Note that, the alkali treatment process S11 and the activation treatment process S12 are performed, and then an impregnation and dipping process of dipping an active component in a support may be additionally provided, if necessary. The $NO_x$ removal catalyst may be regenerated by dipping an active component in a support during the impregnation and dipping process. During the alkali treatment and the activation treatment by acid, an active component (V, W and the like) of the catalyst may be eluted from the support and the deterioration of the $NO_x$ removal performance caused by reduction in concentration of the active components in the catalyst may occur in some cases. $VOSO_4$ on the catalyst surface may be cleaned and removed, the catalyst may be cleaned with water and dried, and then the active component (V, W and the like) may also be impregnated and supported in a support such that the concentration of the active component in the catalyst becomes identical to the concentration thereof before the regeneration. Examples of a method for dipping V include a method for immersing the catalyst in an aqueous solution in which a vanadium compound such as $V_2O_5$, ammonium metavanadate, vanadyl sulfate and the like is dissolved in water, an organic acid and an amine solution. Examples of a method for dipping W include a method for immersing the catalyst in an aqueous solution in which a tungsten compound such as ammonium paratungstate, ammonium metatungstate, tungsten troxide, tungsten chloride and the like is dissolved in water, hydrochloric acid, an amine solution and an organic acid.

As described above, the exhaust gas treatment catalyst according to the embodiment contains a predetermined amount of Si in a support, and thus the exhaust gas treatment catalyst according to the embodiment may be regenerated while suppressing the reduction in strength. In the boiler combustion, when the regeneration treatment of the exhaust gas treatment catalyst according to the embodiment is performed while a V compound such as $VOSO_4$ and the like present in the exhaust gas at high temperature in unburned matters covers the surface of the exhaust gas treatment catalyst according to the embodiment, it is possible to regenerate the exhaust gas treatment catalyst with the reduction in strength suppressed by an alkali treatment and an activation treatment even though V compounds such as $VOSO_4$ and the like covering the surface of the exhaust gas treatment catalyst according to the embodiment are removed.

Therefore, when the exhaust gas treatment catalyst according to the embodiment is used, the catalyst may be reused in a good state while maintaining the removal performance of $NO_x$ included in the exhaust gas discharged from combustion devices such as heavy oil combustion boilers and the like using a low-grade fuel and the like. Further, the exhaust gas treatment catalyst according to the embodiment may be regenerated and used to be used for a longer period, and thus the burden of the facility costs may be alleviated and the amount of industrial waste discharged may be reduced.

Note that, as described above, $VOSO_4$ accumulated on the catalyst surface is removed through an alkali treatment by an alkali aqueous solution, but an active component V of the $NO_x$ removal catalyst and the like may be eluted to reduce the concentration of the active component remaining in the catalyst in some cases. In this case, it is effective to appropriately dip the active component (for example, V, W and the like) in the exhaust gas treatment catalyst according to the embodiment in a support, thereby recovering the catalyst performance.

Further, the exhaust gas treatment catalyst according to the embodiment may also be cleaned and then ground to be reused as a raw material for the exhaust gas treatment catalyst according to the embodiment. Furthermore, the ground exhaust gas treatment catalyst according to the embodiment may also be ground as a raw material in a slurry shape and recoated on the surface of the exhaust gas treatment catalyst according to the embodiment to be reused.

Test Example

Thereafter, test results obtained by using the exhaust gas treatment catalyst according to the embodiment will be described.

Test Examples 1-1 to 1-9

Evaluation of Compressive Strength

First, a used catalyst (honeycomb catalyst of 6 holes×7 holes×900 mm) with vanadium oxysulfate ($VOSO_4$) deposited on the catalyst surface is prepared. The used catalyst is cut into nine equal pieces to prepare Samples 1 to 9. Thereafter, as shown in Table 1, each used catalyst is cleaned under the alkali cleaning condition shown in Table 1. Thereafter, the compressive strength of a regenerated catalyst obtained by drying the used catalyst which is cleaned or by drying and firing the used catalyst which is cleaned is measured. The compressive strength is measured by using a Kiya type hardness tester (manufactured by Fujiwara Scientific Co., Ltd.).

The alkali cleaning condition and compressive strengths of each used catalyst are shown in Table 1.

Here, a composite catalyst of titanium (Ti) and silica (Si) where the content of Si is 11% by mass was used for the support of the catalyst in the test.

The firing temperature was 500° C.

TABLE 1

|  | Alkali cleaning condition | Sample No. | Compressive strength ($Kg/cm^2$) | |
| --- | --- | --- | --- | --- |
|  |  |  | After drying | After drying and firing |
| Test Example 1-1 | 1N—NaOH aqueous solution, | 1 | 1.2 | — |
| Test Example 1-2 | 60° C., 30 min | 2 | — | 1.5 |
| Test Example 1-3 |  | 3 | 1.0 | — |
|  |  | (Average value) | 1.1 | 1.5 |
| Test Example 1-4 | 1N—NaOH aqueous solution, | 4 | 1.3 | — |
| Test Example 1-5 | 60° C., 15 min | 5 | — | 1.7 |
| Test Example 1-6 |  | 6 | 2.6 | — |
|  |  | (Average value) | 2.0 | 1.7 |
| Test Example 1-7 | 1N—NaOH aqueous solution, | 7 | 1.4 | — |
| Test Example 1-8 | 40° C., 30 min | 8 | — | 4.2 |
| Test Example 1-9 |  | 9 | 1.6 | — |
|  |  | (Average value) | 1.5 | 4.2 |

Thereafter, the amounts of V, $SiO_2$ and $VOSO_4$ included in the alkali cleaning liquids in Test Examples 1-2, 1-5 and 1-8 are measured.

TABLE 2

|  | Test Example 1-2 | Test Example 1-5 | Test Example 1-8 |
| --- | --- | --- | --- |
|  | Alkali cleaning condition (1N—NaOH aqueous solution) | | |
|  | 60° C., 30 min | 60° C., 15 min | 40° C., 30 min |
| V (mg/l) | 2000 | 2070 | 1870 |
| $SiO_2$ (mg/l) | 7450 | 3220 | 1910 |
| $VOSO_4$ (g/Total amount) | 5.78 | 5.99 | 5.41 |
| $SiO_2$ (g/Total amount) | 6.73 | 2.91 | 1.72 |
| $VOSO_4$ (g/Catalyst 1 $m^2$) | 35.5 | 36.7 | 33.2 |
| $SiO_2$ (g/Catalyst 1 $m^2$) | 41.3 | 17.8 | 10.6 |

As shown in Table 1, it can be confirmed that the compressive strength of the regenerated catalyst may be improved by drying the used catalyst which has been cleaned with the alkali cleaning liquid and then additionally firing the catalyst (see Test Examples 1-1 to 1-9).

Further, as shown in Table 2, it can be confirmed that the amount of $SiO_2$ released from the used catalyst to the alkali cleaning liquid is smaller under a less rigorous alkali cleaning condition when the catalyst is cleaned with the alkali cleaning liquid (see Test Examples 1-2, 1-5 and 1-8).

Accordingly, it can be said that the smaller the amount of $SiO_2$ released from the used catalyst is, the higher the strength of the used catalyst is when the catalyst is cleaned with the alkali cleaning liquid and then fired.

Test Examples 2-1 to 2-13

Evaluation of Compressive Strength

In addition, other alkali cleaning conditions are used to measure the compressive strength of a regenerated catalyst regenerated by cleaning the used catalyst.

First, as described above, a catalyst before use and a used catalyst (honeycomb catalyst of 6 holes×7 holes×900 mm) with vanadium oxysulfate ($VOSO_4$) deposited on the catalyst surface are prepared. The used catalyst is cut into thirteen equal pieces to prepare Samples 1 to 13. Thereafter, as shown in Table 1, each used catalyst is cleaned under the alkali cleaning condition shown in Table 2. Thereafter, the compressive strength of a regenerated catalyst obtained by drying the used catalyst which is cleaned or by drying and firing the used catalyst which is cleaned is measured. The compressive strength is measured by using the same as above. The alkali cleaning condition and compressive strengths of each catalyst are shown in Table 3.

TABLE 3

| | Alkali cleaning condition | Sample No. | Compressive strength (Kg/cm2) | |
|---|---|---|---|---|
| | | | After drying | After drying and firing |
| Test Example 2-1 | Catalyst before use | 1 | 3.5 | — |
| Test Example 2-2 | | 2 | 3.0 | — |
| | | (Average value) | 3.3 | — |
| Test Example 2-3 | Used catalyst (before alkali cleaning) | 3 | 4.2 | — |
| Test Example 2-4 | | 4 | 4.7 | — |
| | | (Average value) | 4.5 | — |
| Test Example 2-5 | Used catalyst (After alkali cleaning) | 1N—NaOH aqueous solution 40° C., 15 min | 5 | 2.5 | — |
| Test Example 2-6 | | | 6 | — | 2.5 |
| Test Example 2-7 | | | 7 | 3.5 | — |
| | | | (Average value) | 3.0 | 2.5 |
| Test Example 2-8 | | 1N—NaOH aqueous solution 20° C., 30 min | 8 | 3.9 | — |
| Test Example 2-9 | | | 9 | — | 3.6 |
| Test Example 2-10 | | | 10 | 2.2 | — |
| | | | (Average value) | 3.1 | 3.6 |
| Test Example 2-11 | | 1N—NaOH aqueous solution, Normal temperature, 120 min | 11 | 2.7 | — |
| Test Example 2-12 | | | 12 | — | 4.1 |
| Test Example 2-13 | | | 13 | 2.9 | — |
| | | | (Average value) | 2.8 | 4.1 |

Thereafter, the amounts of V, $SiO_2$ and $VOSO_4$ included in the alkali cleaning liquids in Test Examples 2-6, 2-9 and 2-12 are measured.

TABLE 4

| | Test Example 2-6 | Test Example 2-9 | Test Example 2-12 |
|---|---|---|---|
| | Alkali cleaning condition (1N—NaOH aqueous solution) | | |
| | 40° C., 15 min | Normal temperature, 30 min | Normal temperature, 120 min |
| V (mg/l) | 2320 | 1460 | 1860 |
| $SiO_2$ (mg/l) | 394 | 221 | 1430 |
| $VOSO_4$ (g/Total amount) | 6.71 | 4.22 | 5.83 |
| $SiO_2$ (g/Total amount) | 0.36 | 0.20 | 1.29 |
| $VOSO_4$ (g/Catalyst 1 $m^2$) | 41.2 | 25.9 | 33.0 |
| $SiO_2$ (g/Catalyst 1 $m^2$) | 2.2 | 1.2 | 7.9 |

As shown in Table 3, it can be confirmed that the used catalyst immersed in a 1 N—NaOH aqueous solution at 40° C. for 15 minutes has a strength almost equal to that of the catalyst before use even after drying (see Test Example 2-1, 2-2 and 2-5 to 2-7). Furthermore, it can be confirmed that the strengths of the used catalyst immersed in a 1 N—NaOH aqueous solution at normal temperature (20° C.) for 30 minutes and the used catalyst immersed in a 1 N—NaOH aqueous solution at normal temperature (20° C.) for 120 minutes are all improved by firing all the catalysts after drying (see Test Examples 2-8 to 2-13).

Further, as shown in Table 4, it can be said that $VOSO_4$ is still remaining on the catalyst surface from the fact that the amount of $VOSO_4$ in the 1 N—NaOH aqueous solution, in which the used catalyst has been immersed at room temperature (20° C.) for 30 minutes, is small (see Test Example 2-9). In addition, it can be said that when the used catalyst is immersed in the 1 N—NaOH aqueous solution at room temperature for 120 minutes, $VOSO_4$ may be separated while suppressing the amount of $SiO_2$ separated from the used catalyst within an allowable range (see Test Example 2-12).

Furthermore, it can be confirmed that the used catalyst immersed in the 1 N—NaOH aqueous solution at 20° C. for 30 minutes and the used catalyst immersed in the 1 N—NaOH aqueous solution at normal temperature for 120 minutes may be dried and then additionally subjected to firing to improve the compressive strength of the regenerated exhaust gas treatment catalyst (see Test Examples 2-8 to 2-13).

Accordingly, it can be said that, in the case of immersion in an NaOH aqueous solution at 40° C. for 15 minutes and even in the case of immersion in an NaOH aqueous solution at room temperature (20° C.), $VOSO_4$ may be sufficiently separated from the used catalyst while keeping the amount of $SiO_2$ separated from the exhaust gas treatment catalyst within an allowable range, and the catalyst may be regenerated. Further, it can be said that the smaller the amount of $SiO_2$ released from the exhaust gas treatment catalyst is, the higher the strength of the used catalyst may be when the catalyst is cleaned with the alkali cleaning liquid and then fired.

<Exhaust Gas Treatment Apparatus>

Figure 5:
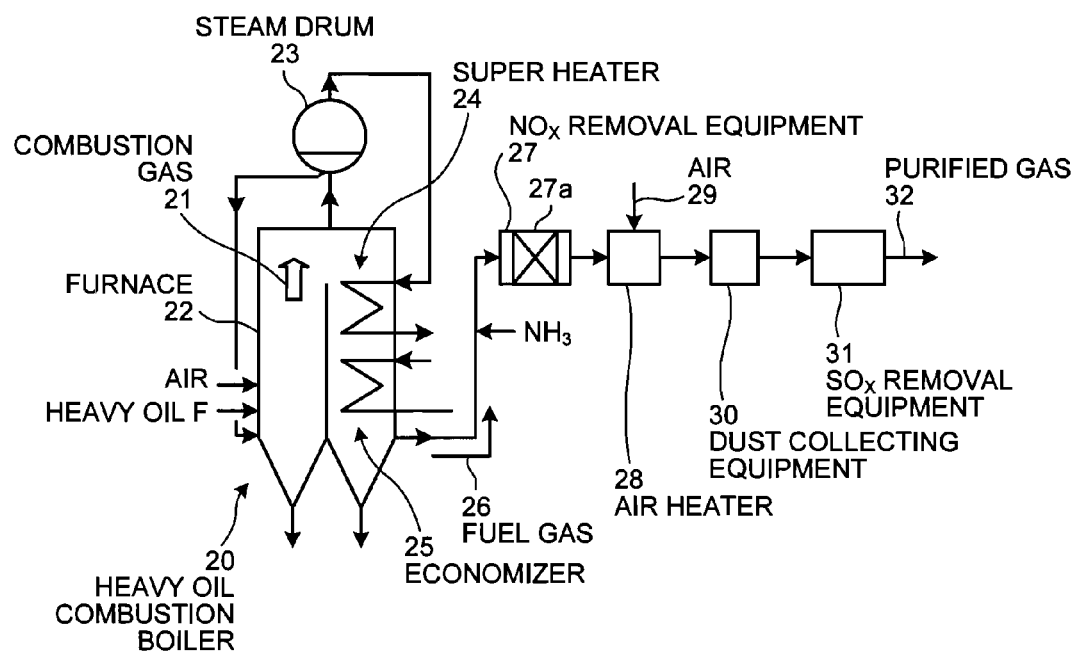
FIG. 5 is a schematic view of an exhaust gas treatment apparatus of a heavy oil combustion boiler.

Preferred embodiments, in which the exhaust gas treatment catalyst according to the embodiment is used in an exhaust gas treatment apparatus, will be described. FIG. 5 is a schematic view of an exhaust gas treatment apparatus of a heavy oil combustion boiler. As illustrated in FIG. 5, a combustion gas 21 in a heavy oil combustion boiler 20 using heavy oil F produces steam in a steam generating pipe in a furnace 22 (the produced steam is separated into gas and liquid in a steam drum 23, the steam is guided into a super heater 24 to become a superheated water steam and is used for driving a steam turbine, and then the condensed water is refluxed into a water pipe in the furnace 22 and re-evaporated), the steam is superheated by the super heater 24, and then water supplied to the heavy oil combustion boiler 20 is heated by an economizer 25 to discharge the combustion gas 21 as a flue gas 26 from an exit of the economizer 25. The flue gas 26 discharged from the above economizer 25 is supplied to a $NO_x$ removal equipment 27 that denitrifies nitrogen oxides ($NO_x$) in the flue gas, air 29 is heated by heat exchange in an air heater (AH) 28, and then the flue gas 26 is supplied to a dust collecting equipment 30, then again supplied to a $SO_x$ removal equipment 31 that desulfurizes sulfur oxides ($SO_x$) in the flue gas, and then is discharged in the atmosphere as a purified gas 32.

Further, the $NO_x$ removal equipment 27 sprays ammonium ($NH_3$) to the upstream side of the $NO_x$ removal to reduce and denitrify the flue gas 26 from the heavy oil combustion boiler 20. In front of the $NO_x$ removal equipment 27, ammonia is sprayed to denitrify ammonia from the $NO_x$ removal equipment 27. The $NO_x$ removal equipment 27 includes a $NO_x$ removal catalyst 27a, and the exhaust gas treatment catalyst according to the embodiment is used in the $NO_x$ removal catalyst 27a. Accordingly, even though the NaOH aqueous solution is used during the regeneration of the $NO_x$ removal catalyst 27a, the deterioration caused by the NaOH aqueous solution may be suppressed, and thus the catalyst may be regenerated while suppressing the reduction in strength. For this reason, when the exhaust gas treatment catalyst according to embodiments of the invention is used, the catalyst may be reused in a good state while maintaining the removal performance of $NO_x$ included in the combustion gas 21 discharged from the heavy oil combustion boiler 20 using a low-grade fuel and the like.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A method for regenerating an exhaust gas treatment catalyst whose $NO_x$ removal performance is reduced by sulfur dioxides and vanadium included in an exhaust gas discharged from a heavy oil combustion boiler,
   the exhaust gas treatment catalyst comprising:
   titanium and silica; and
   an active component comprising one selected from the group consisting of vanadium and tungsten in a support having an Si content of 10% by mass or more, and
   the method comprising:
   immersing the exhaust gas treatment catalyst in an alkali cleaning liquid at a concentration from 0.5 N to 2.0 N so as to remove vanadium oxysulfate on the surface of the exhaust gas treatment catalyst, and
   subjecting the catalyst to activation treatment with an acid aqueous solution after cleaning the exhaust gas treatment catalyst with the alkali cleaning liquid.

2. The method for regenerating an exhaust gas treatment catalyst according to claim 1, wherein the exhaust gas treatment catalyst further comprises a coating layer formed of at least one component selected from the group consisting of silicalite and metallosilicate on a surface thereof.

3. The method for regenerating an exhaust gas treatment catalyst according to claim 1, wherein the alkali cleaning liquid is an aqueous solution of sodium hydroxide, potassium hydroxide, sodium carbonate, sodium bicarbonate or potassium carbonate, and the acid aqueous solution is an aqueous solution of hydrochloric acid, nitric acid, hydrogen fluoride or sulfuric acid.

* * * * *